(12) United States Patent
She et al.

(10) Patent No.: US 9,363,800 B2
(45) Date of Patent: Jun. 7, 2016

(54) METHOD FOR DETERMINING/FACILITATING THE DETERMINATION OF PUCCH RESOURCE AND APPARATUS THEREOF

(71) Applicant: Alcatel Lucent, Boulogne Billancourt (FR)

(72) Inventors: Feng She, Shanghai (CN); Yun Deng, Shanghai (CN); Hongwei Yang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 64 days.

(21) Appl. No.: 14/356,648

(22) PCT Filed: Nov. 6, 2012

(86) PCT No.: PCT/IB2012/002669
§ 371 (c)(1),
(2) Date: May 7, 2014

(87) PCT Pub. No.: WO2013/068841
PCT Pub. Date: May 16, 2013

(65) Prior Publication Data
US 2014/0328297 A1 Nov. 6, 2014

(30) Foreign Application Priority Data

Nov. 7, 2011 (CN) .......................... 2011 1 0348875

(51) Int. Cl.
*H04W 4/00* (2009.01)
*H04W 72/04* (2009.01)
*H04L 5/00* (2006.01)
*H04L 1/18* (2006.01)

(52) U.S. Cl.
CPC ......... *H04W 72/0406* (2013.01); *H04L 1/1854* (2013.01); *H04L 5/0055* (2013.01); *H04L 5/0091* (2013.01); *H04L 1/1812* (2013.01)

(58) Field of Classification Search
CPC ... H04L 5/0091; H04L 5/0055; H04L 1/1854; H04W 72/0406

USPC .......................................................... 370/329
See application file for complete search history.

(56) References Cited

U.S. PATENT DOCUMENTS

2010/0272048 A1   10/2010   Pan et al.
2011/0268062 A1*  11/2011   Ji .......................... H04J 11/005
                                                              370/329
2012/0002631 A1    1/2012   Nishio et al.

FOREIGN PATENT DOCUMENTS

EP     2 381 735 A1    10/2011
EP     2 383 928 A2    11/2011
(Continued)

OTHER PUBLICATIONS

Research in Motion et al., "PUCCH resource allocation for channel selection with Tx diversity," 3$^{rd}$ Generation Partnership Project (3GPP), 3GPP RAN WG1 Meeting #62bis, R1-105511, pp. 1-4, XP050450630, Xi'an China, Oct. 11-15, 2010.
(Continued)

*Primary Examiner* — Sai-Ming Chan
(74) *Attorney, Agent, or Firm* — Fay Sharpe LLP

(57) ABSTRACT

The present invention discloses a method for determining a Physical Uplink Control Channel PUCCH resource for a user equipment and a corresponding user equipment, and a method for facilitating the determination of a PUCCH resource for a user equipment and a corresponding base station, wherein the PUCCH resource is used to transmit a Hybrid Automatic Repeat Request HARQ feed back (ACK or NACK) of the user equipment with respect to its corresponding Physical Downlink Shared Channel PDSCH. In the present invention, an index value for a Control Channel Element CCE scheduled for the user equipment in an Enhanced Physical Downlink Control Channel E-PDCCH is firstly acquired, and then based on the index value and a first parameter, the PUCCH resource used to transmit the HARQ feedback of the user equipment with respect to its corresponding PDSCH is determined, the first parameter representing a reference value that should be used when determining the PUCCH resource used to transmit the HARQ feedback of the user equipment with respect to its corresponding PDSCH, if scheduling the CCE for the user equipment in the E-PDCCH.

14 Claims, 3 Drawing Sheets

(56) References Cited

FOREIGN PATENT DOCUMENTS

| JP | 2013-526206 A | 6/2013 |
| JP | 2014-517643 A | 7/2014 |
| TW | 201115968 A1 | 5/2011 |
| WO | 2010/106786 A1 | 9/2010 |
| WO | 2011/136523 A2 | 11/2011 |
| WO | 2013/062238 A1 | 5/2013 |

OTHER PUBLICATIONS

Huawei et al., "Reserving two PUCCH ACK/NACK resources for channel selection from the PCell," 3$^{rd}$ Generation Partnership Project (3GPP), 3GPP RAN WG1 Meeting #62bis, R1-105244, pp. 1-4, XP050450428, Xi'an China, Oct. 11-15, 2010.

International Search Report for PCT/IB2012/002669 dated Apr. 25, 2013.
English Bibliography for Japanese Patent Publication No. JP2013526206A, published Jun. 20, 2013, printed from Thomson Innovation on May 28, 2015, 4 pp.
English Bibliography for Japanese Patent Publication No. JP2014517643A, published Jul. 17, 2014, printed from Thomson Innovation on May 28, 2015, 3 pp.
English Bibliography for PCT Patent Publication No. WO2010106786A1, published Sep. 23, 2010, printed from Thomson Innovation on May 28, 2015, 4 pp.
English Bibliography for Taiwanese Patent Application Publication No. TW201115968A, published May 1, 2011, printed from Thomson Innovation on Apr. 21, 2015, 4 pp.
PCT Pat. App. No. PCT/IB2012/002669, Written Opinion of the International Searching Authority, mailed Apr. 25, 2013, 7 pp.

* cited by examiner

METHOD FOR DETERMINING/FACILITATING THE DETERMINATION OF PUCCH RESOURCE AND APPARATUS THEREOF

FIELD OF THE INVENTION

The present invention relates to communication field, and more particularly relates to a method for determining a Physical Uplink Control Channel PUCCH resource for a user equipment and a corresponding user equipment, and a method for facilitating the determination of a PUCCH resource for a user equipment and a corresponding base station, wherein the PUCCH resource is used to transmit a Hybrid Automatic Repeat Request HARQ feedback (ACK or NACK) of the user equipment with respect to its corresponding Physical Downlink Shared Channel PDSCH.

BACKGROUND OF THE INVENTION

Designing an Enhanced Physical Downlink Control Channel E-PDCCH is regarded as an effective method for expanding the scheduling capacity of a LTE-A system. The E-PDCCH supports demodulation based on a UE specific Demodulation Reference Signal (DM-RS) rather than a cell specific Reference Signal (CRS). Compared with the traditional Physical Downlink Control Channel PDCCH, more flexibility brought by an advanced antenna and a higher order modulation deployment may be desired in the E-PDCCH. The E-PDCCH may be achieved by enhancing the traditional PDCCH and/or designing a new PDCCH in a data region (i.e. Physical Downlink Shared Channel PDSCH).

According to the 3GPP related standards, a PUCCH resource used to transmit a HARQ feedback of a user equipment with respect to its corresponding PDSCH can be determined based on a Control Channel Element CCE scheduled for the user equipment in the PDCCH.

For the E-PDCCH, there also exists a need to determine a PUCCH resource used to transmit a HARQ feedback of a user equipment with respect to its corresponding PDSCH based on a Control Channel Element CCE scheduled for the user equipment in the E-PDCCH.

SUMMARY OF THE INVENTION

According to a first aspect of the present invention, there is provided a method for determining a Physical Uplink Control Channel PUCCH resource for a user equipment, wherein the PUCCH resource is used to transmit a Hybrid Automatic Repeat Request HARQ feedback of the user equipment with respect to its corresponding Physical Downlink Shared Channel PDSCH, the method comprising steps of: acquiring an index value for a Control Channel Element CCE scheduled for the user equipment in an Enhanced Physical Downlink Control Channel E-PDCCH; and determining, based on the index value and a first parameter, the PUCCH resource used to transmit the HARQ feedback of the user equipment with respect to its corresponding PDSCH, the first parameter representing a reference value that should be used when determining the PUCCH resource used to transmit the HARQ feedback of the user equipment with respect to its corresponding PDSCH, if scheduling the CCE for the user equipment in the E-PDCCH.

According to a second aspect of the present invention, there is provided a user equipment for determining a Physical Uplink Control Channel PUCCH resource for the user equipment, wherein the PUCCH resource is used to transmit a Hybrid Automatic Repeat Request HARQ feedback of the user equipment with respect to its corresponding Physical Downlink Shared Channel PDSCH, the user equipment comprising: an acquiring unit configured to acquire an index value for a Control Channel Element CCE scheduled for the user equipment in an Enhanced Physical Downlink Control Channel E-PDCCH; and a determining unit configured to determine, based on the index value and a first parameter, the PUCCH resource used to transmit the HARQ feedback of the user equipment with respect to its corresponding PDSCH, the first parameter representing a reference value that should be used when determining the PUCCH resource used to transmit the HARQ feedback of the user equipment with respect to its corresponding PDSCH, if scheduling the CCE for the user equipment in the E-PDCCH.

According to a third aspect of the present invention, there is provided a method for facilitating the determination of a Physical Uplink Control Channel PUCCH resource for a user equipment, wherein the PUCCH resource is used to transmit a Hybrid Automatic Repeat Request HARQ feedback of the user equipment with respect to its corresponding Physical Downlink Shared Channel PDSCH, the method comprising steps of: acquiring a first parameter, the first parameter representing a reference value that should be used when determining the PUCCH resource used to transmit the HARQ feedback of the user equipment with respect to its corresponding PDSCH, if scheduling a Control Channel Element CCE for the user equipment in an Enhanced Physical Downlink Control Channel E-PDCCH; and transmitting the first parameter to the user equipment through signaling.

According to a fourth aspect of the present invention, there is provided a base station for facilitating the determination of a Physical Uplink Control Channel PUCCH resource for a user equipment, wherein the PUCCH resource is used to transmit a Hybrid Automatic Repeat Request HARQ feedback of the user equipment with respect to its corresponding Physical Downlink Shared Channel PDSCH, the base station comprising: an acquiring unit configured to acquire a first parameter, the first parameter representing a reference value that should be used when determining the PUCCH resource used to transmit the HARQ feedback of the user equipment with respect to its corresponding PDSCH, if scheduling a Control Channel Element CCE for the user equipment in an Enhanced Physical Downlink Control Channel E-PDCCH; and a transmitting unit configured to transmit, through signaling, the first parameter to the user equipment.

According to the present invention, the PUCCH resource used to transmit the HARQ feedback of the user equipment with respect to its corresponding PDSCH can be determined based on the CCE scheduled for the user equipment in the E-PDCCH.

BRIEF DESCRIPTION OF THE DRAWINGS

Other objects and effects of the present invention will become clearer and easier to understand by making references to the following description taken in conjunction with the accompanying drawings and along with more comprehensive understanding of the present invention, wherein.

In all of the accompanying drawings, the same reference signs represent identical, similar or corresponding features or functions.

DETAILED DESCRIPTION OF EMBODIMENTS

Embodiments of the present invention will be described below in detail by making references to the accompanying drawings.

Figure 1:
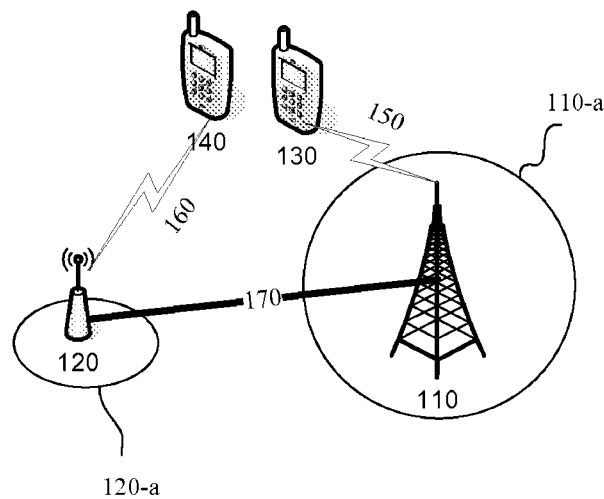
FIG. 1 illustrates a wireless communication system where the present invention can be carried out.

FIG. 1 illustrates a wireless communication system where the present invention can be carried out.

As illustrated in FIG. 1, the wireless communication system 100 comprises a first base station 110 corresponding to a first cell, a second base station 120 corresponding to a second cell, user equipments UEs 130 and 140.

The first base station 110 provides a first coverage range 110-a, and the second base station 120 provides a second coverage range 120-a.

Here, the user equipment 130 is assumed within the first coverage range 110-a. Thus, the user equipment 130 communicates with the first base station 110 via a wireless link 150. The user equipment 140 is assumed within the second coverage range 120-a. Thus, the user equipment 140 communicates with the second base station 120 via a wireless link 160. In addition, the first base station 110 communicates with the second base station 120 via a backhaul link 170. The backhaul link 170 may be wired and may also be wireless.

Here, it is assumed that the first base station 110 and the second base station 120 are an evolved Node B (eNB).

Certainly, those skilled in the art would understand that the wireless communication system 100 may comprise more or less base stations, and each base station may comprise more or less user equipments.

Figure 2:
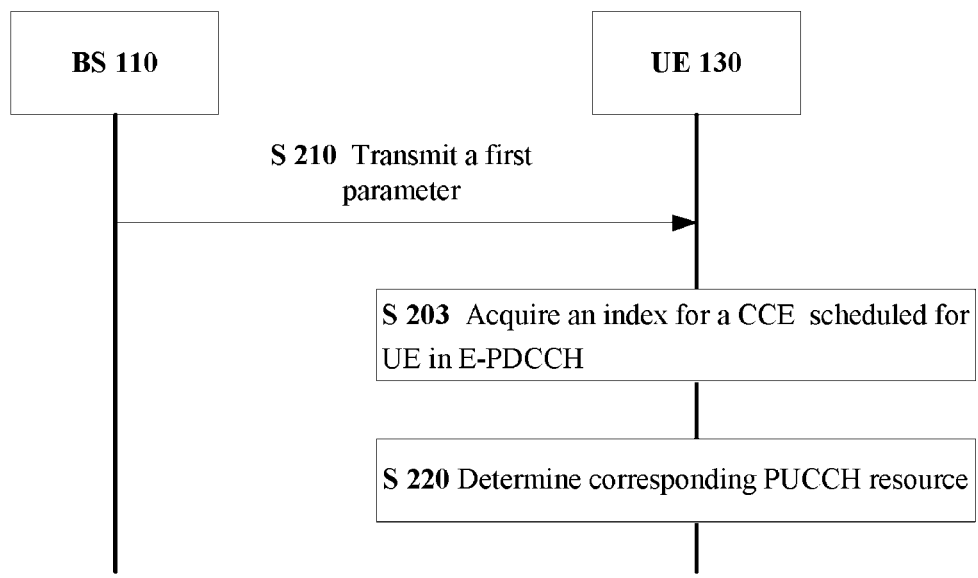
FIG. 2 illustrates a signal flow diagram between a user equipment and a base station according to one embodiment of the present invention.

FIG. 2 illustrates a signal flow diagram between a user equipment and a base station according to one embodiment of the present invention, wherein the user equipment is, for example, the user equipment 130 and the base station is, for example, the first base station 110.

As illustrated in FIG. 2, in Step S210, the base station 110 transmits a first parameter $N_{PUCCH}^{(2)}$ to the user equipment 130 through RRC (Radio Resource Control) signaling (e.g. RRC connection reconfiguration signaling), the first parameter represents a reference value that should be used when determining a PUCCH resource used to transmit a HARQ feedback of the user equipment 130 with respect to its corresponding PDSCH, if scheduling a CCE for the user equipment 130 in an E-PDCCH. Hereinafter, the first parameter $N_{PUCCH}^{(2)}$ is called as the reference value for E-PDCCH scheduling.

Then, the user equipment 130 determines, based on the first parameter and based on an index value $n_{eCCE}$ for the CCE scheduled for the user equipment 130 in the E-PDCCH as acquired (Step S203) after receiving the first parameter from the base station 110, the PUCCH resource used to transmit the HARQ feedback of the user equipment 130 with respect to its corresponding PDSCH as illustrated in Step S220.

The PDCCH is organized by taking CCE as granularity. One CCE includes 9 REGs (Resource Element Groups) and one REG includes 4 REs (Resource Elements). Thus, one CCE includes 36 REs. The PDCCH resource occupied by a User Equipment UE may include 1, 2, 4 or 8 CCEs.

For the E-PDCCH, it may be organized by taking CCE as granularity and may also be organized by taking a new resource unit eCCE (enhanced Control Channel Element) as granularity. One eCCE may include one or more REs. A UE may acquire the size and position information of the eCCE by blindly detecting its own E-PDCCH through its own RNTI (Radio Network Temporary Identity), and then uses the size and position information to obtain $n_{eCCE}$.

According to one embodiment of the present invention, $n_{eCCE}$ may be a minimum value, a maximum value or a mean value of index values for CCEs scheduled for the user equipment 130 in the E-PDCCH.

For example, if the CCEs with the index values 5, 6 and 7 are scheduled for the user equipment 130 while the CCEs with the index values 2, 3 and 4 are scheduled for other user equipments, in case that $n_{eCCE}$ is the minimum value of the index values for the CCEs scheduled for the user equipment 130 in the E-PDCCH, then $n_{eCCE}$ should be 5; in case that $n_{eCCE}$ is the maximum value of the index values for the CCEs scheduled for the user equipment 130 in the E-PDCCH, then $n_{eCCE}$ should be 7; in case that $n_{eCCE}$ is the mean value of the index values for the CCEs scheduled for the user equipment 130 in the E-PDCCH, then $n_{eCCE}$ should be 6.

In this embodiment of the present invention, the PUCCH resource used to transmit the HARQ feedback of the user equipment 130 with respect to its corresponding PDSCH is determined based on the formula below:

$$n_{PUCCH}^{(1)} = n_{eCCE} + N_{PUCCH}^{(2)} \quad (1)$$

where $n_{PUCCH}^{(1)}$ is the position of the PUCCH resource used to transmit the HARQ feedback of the user equipment 130 with respect to its corresponding PDSCH.

That is to say, in this embodiment, the position of the PUCCH resource used to transmit the HARQ feedback of the user equipment 130 with respect to its corresponding PDSCH is the sum of the index value for the CCE scheduled for the user equipment 130 in the E-PDCCH and the reference value for E-PDCCH scheduling.

Figure 3:
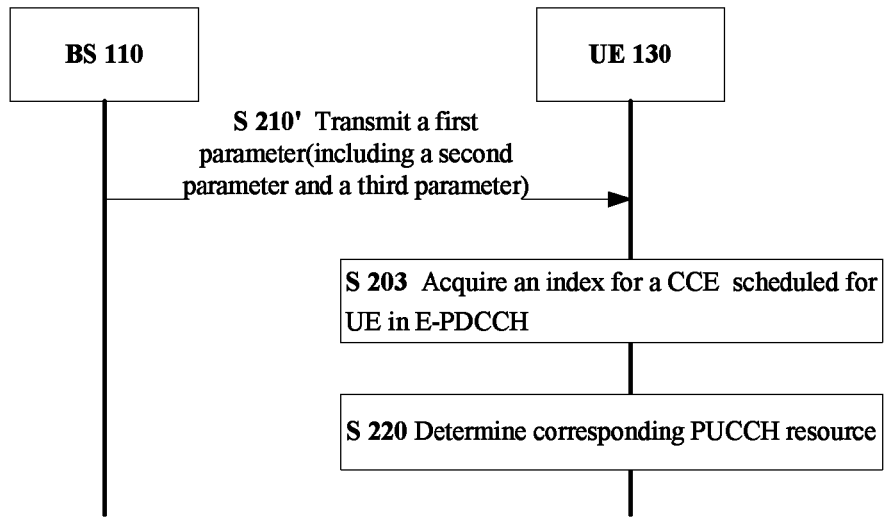
FIG. 3 illustrates a signal flow diagram between a user equipment and a base station according to another embodiment of the present invention.

FIG. 3 illustrates a signal flow diagram between a user equipment and a base station according to another embodiment of the present invention.

The signal flow diagram illustrated in FIG. 3 is substantially the same as that in FIG. 2 except that in Step S210', the first parameter transmitted to the user equipment 130 by the base station 110 through RRC signaling (e.g. RRC connection reconfiguration signaling) consists of a second parameter $N_{PUCCH}^{(1)}$ and a third parameter $N_{add}$, wherein the second parameter represents a reference value that should be used when determining the PUCCH resource used to transmit the HARQ feedback of the user equipment 130 with respect to its corresponding PDSCH, if scheduling the CCE for the user equipment 130 in a Physical Downlink Control Channel PDCCH, hereinafter the second parameter $N_{PUCCH}^{(1)}$ will be called as a reference value for PDCCH scheduling; the third parameter $N_{add}$ represents an offset between the first parameter and the second parameter.

At present, the base station has transmitted through signaling the second parameter $N_{PUCCH}^{(1)}$ to the user equipment it serves to enable the user equipment to determine, based on a Control Channel Element CCE scheduled for the user equipment in the PDCCH, the PUCCH resource used to transmit the HARQ feedback of the user equipment with respect to its corresponding PDSCH.

Since network side knows the complete scheduling information, it may calculate an accurate $N_{add}$ value and may inform the UE through RRC signaling.

In this embodiment of the present invention, the PUCCH resource used to transmit the HARQ feedback of the user equipment 130 with respect to its corresponding PDSCH is determined based on the formula below:

$$n_{PUCCH}^{(1)}=n_{eCCE}+N_{add}+N_{PUCCH}^{(1)} \qquad (2)$$

That is to say, in this embodiment, the position of the PUCCH resource used to transmit the HARQ feedback of the user equipment 130 with respect to its corresponding PDSCH is the sum of the offset indicated by the network side, the index value for the CCE scheduled for the user equipment in the E-PDCCH and the reference value for PDCCH scheduling as indicated by the network side.

In the embodiments as illustrated by FIG. 2 and FIG. 3, the first parameter or the second and third parameters used in determining the PUCCH resource used to transmit the HARQ feedback of the user equipment 130 with respect to its corresponding PDSCH are mainly determined by the network side.

The advantage of these embodiments is reducing the calculating burden of the user equipment.

Figure 4:
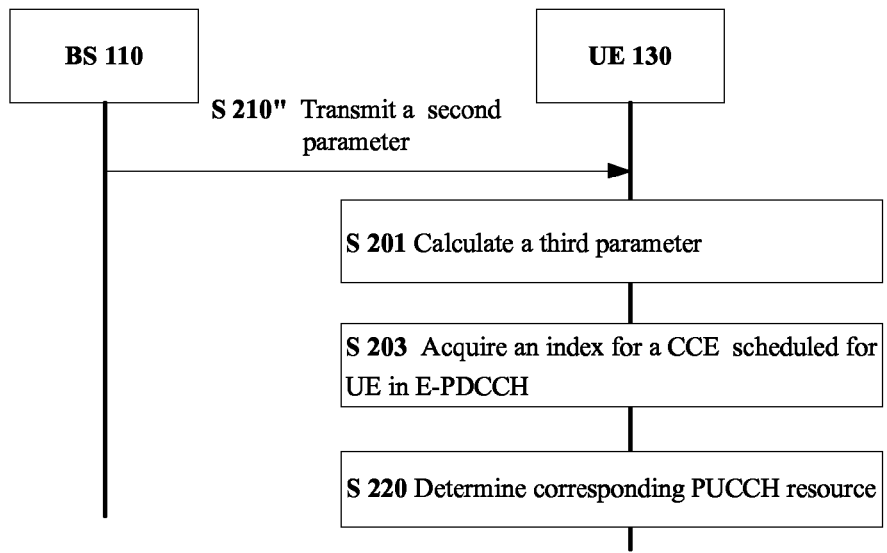
FIG. 4 illustrates a signal flow diagram between a user equipment and a base station according to a further embodiment of the present invention.

FIG. 4 illustrates a signal flow diagram between a user equipment and a base station according to a further embodiment of the present invention.

The signal flow diagram illustrated in FIG. 4 is substantially the same as that in FIG. 3 except that in Step S210", the base station 110 only transmits the second parameter $N_{PUCCH}^{(1)}$ to the user equipment 130 through RRC signaling (e.g. RRC connection reconfiguration signaling).

In addition, before Step S220, Step S201 is further comprised, i.e. the third parameter $N_{add}$ is calculated by the user equipment 130 itself.

The third parameter is calculated based on a setting of the amount of resources used by a Physical Control Format Indication Channel PCFICH and a Physical Hybrid Repeat Indication Channel PHICH, the number of system antennas, and downlink bandwidth of a cell accessed by the user equipment 130.

In the present invention, it can be deemed that it is necessary to enable the E-PDCCH only when the traditional PDCCH resources are insufficient or are used up. Thus, it can be deemed that $N_{add}$ is the maximum number of CCEs in the traditional PDCCH.

For the FDD system, it is assumed that 3 OFDM symbols of the traditional PDCCH are occupied by PCFICH+PHICH+ PDCCH+reference signals; two antennas mean that ⅓ REs of the first OFDM symbol are occupied by the reference signals, then each RB remains 2 REGs and 20M bandwidth has 100 RBs, that is, 100*2=200 REGs are remained; the other two OFDM symbols have 2*100*3=600 REGs; the total is 800 REGs; PCFICH generally occupies 4 REGs; PHICH group=NG*(100/8) (integer, taking the upper limit, wherein the NG value is used to configure PHICH and is determined by upper layer); e.g. NG=1, then there are 12 PHICH groups each including 3 REGs, and thus the PHICH occupies 3*12=36 REGs; finally PDCCH REGs=800-4-36=760; then CCEs=760/9=84; thus, $N_{add}$=84.

For the TDD system, one uplink subframe may report HARQ ACK/NACK of several downlink subframes, e.g., if the number of the reported downlink subframes is 2, then $N_{add}$=2×84.

In this embodiment, the PUCCH resource used to transmit the HARQ feedback of the user equipment 130 with respect to its corresponding PDSCH is determined based on the formula below:

$$n_{PUCCH}^{(1)}=n_{eCCE}+N_{add}+N_{PUCCH}^{(1)} \qquad (2)$$

That is to say, in this embodiment, the position of the PUCCH resource used to transmit the HARQ feedback of the user equipment 130 with respect to its corresponding PDSCH is the sum of the offset calculated by the UE side, the index value for the CCE scheduled for the user equipment in the E-PDCCH and the reference value for PDCCH scheduling as indicated by network side.

The advantage of this embodiment is calculating the third parameter by the user equipment itself, and thus signaling between the base station and the user equipment can be saved.

Those skilled in the art would understand that in the embodiments as illustrated in FIG. 2-FIG. 4, before Steps S210, S210' and S210", steps for acquiring by the base station the first parameter, the second and third parameters, and the second parameter are further comprised. For example, the base station may acquire what values the first parameter, the second and third parameters, and the second parameter should take, by means of its complete understanding of the scheduling information.

Figure 5:
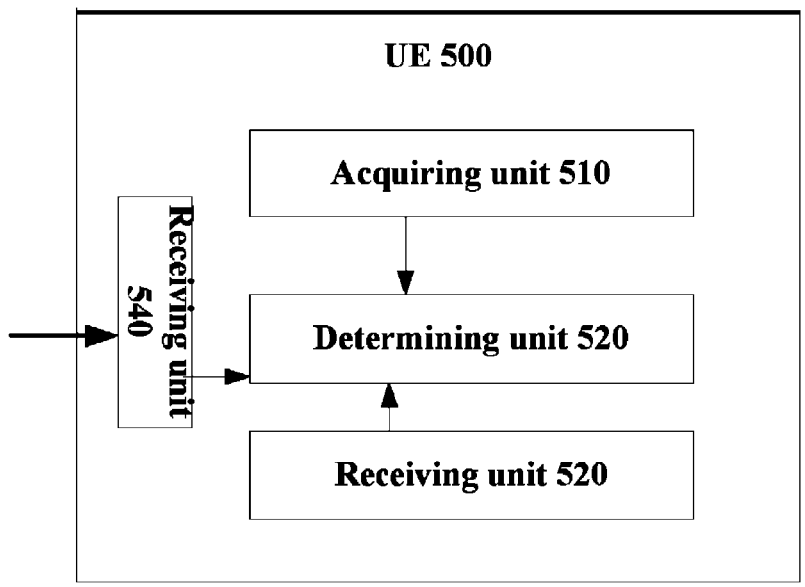
FIG. 5 illustrates a block diagram of a user equipment according to one embodiment of the present invention.

FIG. 5 illustrates a block diagram of a user equipment according to one embodiment of the present invention.

The user equipment 500, for example, is the above-described user equipments 130 and 140.

As illustrated in FIG. 5, the user equipment 500 comprises an acquiring unit 510 configured to acquire an index value for a Control Channel Element CCE scheduled for the user equipment in an Enhanced Physical Downlink Control Channel E-PDCCH; and a determining unit 520 configured to determine, based on the index value and a first parameter, a PUCCH resource used to transmit a HARQ feedback of the user equipment with respect to its corresponding PDSCH, the first parameter representing a reference value that should be used when determining the PUCCH resource used to transmit the HARQ feedback of the user equipment with respect to its corresponding PDSCH, if scheduling the CCE for the user equipment in the E-PDCCH.

According to one embodiment of the present invention, the first parameter consists of a second parameter and a third parameter, wherein the second parameter represents a reference value that should be used when determining the PUCCH resource used to transmit the HARQ feedback of the user equipment with respect to its corresponding PDSCH, if scheduling the CCE for the user equipment in a Physical Downlink Control Channel PDCCH; the third parameter represents an offset between the first parameter and the second parameter.

According to one embodiment of the present invention, the user equipment 500 further comprises: a calculating unit 530 configured to calculate the third parameter; a receiving unit 540 configured to receive the second parameter from a serving base station of the user equipment through signaling.

According to one embodiment of the present invention, the receiving unit 540 is configured to receive the second parameter and the third parameter from a serving base station of the user equipment 500 through signaling.

According to one embodiment of the present invention, the third parameter is calculated based on a setting of the amount of resources used by a Physical Control Format Indication Channel PCFICH and a Physical Hybrid Repeat Indication Channel PHICH, the number of system antennas, and downlink bandwidth of a cell accessed by the user equipment.

According to one embodiment of the present invention, the receiving unit 540 is configured to receive the first parameter from a serving base station of the user equipment through signaling.

According to one embodiment of the present invention, what acquired by the acquiring unit 510 is a minimum value, a maximum value or a mean value of index values of CCEs scheduled for the user equipment in the E-PDCCH.

Figure 6:
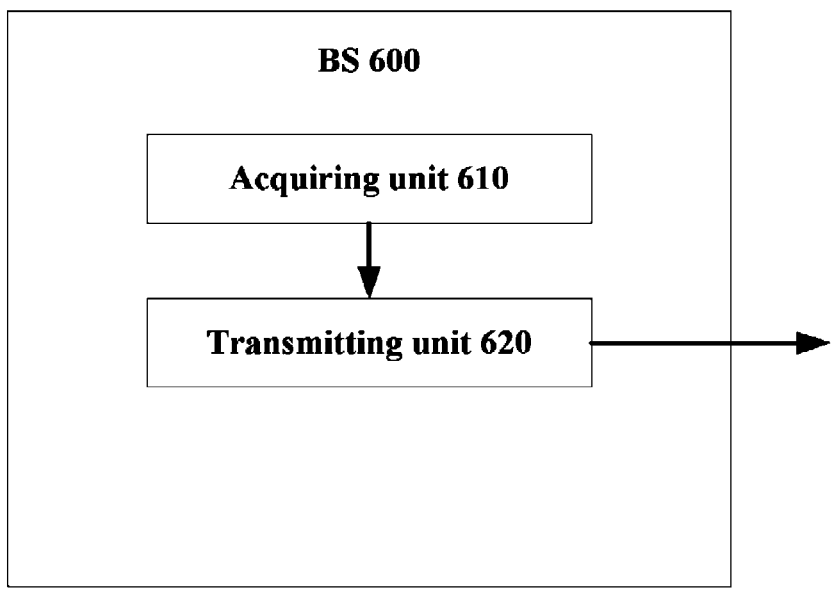
FIG. 6 illustrates a block diagram of a base station according to one embodiment of the present invention.

FIG. 6 illustrates a block diagram of a base station according to one embodiment of the present invention.

The base station 600, for example, is the above-described base stations 110 and 120.

As illustrated in FIG. 6, the base station 600 comprises a transmitting unit 610 configured to transmit, through signaling, a first parameter to a user equipment, the first parameter representing a reference value that should be used when determining a PUCCH resource used to transmit the HARQ feedback of the user equipment with respect to its corresponding PDSCH, if scheduling a Control Channel Element CCE for the user equipment in an Enhanced Physical Downlink Control Channel E-PDCCH.

According to one embodiment of the present invention, the first parameter consists of a second parameter and a third parameter, wherein the second parameter represents a reference value that should be used when determining the PUCCH resource used to transmit the HARQ feedback of the user equipment with respect to its corresponding PDSCH, if scheduling the CCE for the user equipment in a Physical Downlink Control Channel PDCCH; the third parameter represents an offset between the first parameter and the second parameter.

It should be noted that in order to make the present invention easier to understand, some more specific technical details that are well-known to those skilled in the art and may be essential for implementation of the present invention are omitted in the above descriptions.

Those skilled in the art should also understand that the present invention is not limited to the above-described steps and it further comprises the combination, order change, etc. of the above-described steps. The final scope of the present invention is defined by the appended claims.

Hence, selecting and describing the embodiments is to better explain the principle of the present invention and its actual application, and to make it clear for those of ordinary skill in the art that without departure from the essence of the present invention, all modifications and changes fall within the protection scope of the present invention defined by claims.

What is claimed is:

1. A method for determining a Physical Uplink Control Channel PUCCH resource for a user equipment, wherein the PUCCH resource is used to transmit a Hybrid Automatic Repeat Request HARQ feedback of the user equipment with respect to its corresponding Physical Downlink Shared Channel PDSCH, the method comprising:
   acquiring an index value for a Control Channel Element CCE scheduled for the user equipment in an Enhanced Physical Downlink Control Channel E-PDCCH; and
   determining, based on the index value and a first parameter, the PUCCH resource used to transmit the HARQ feedback of the user equipment with respect to its corresponding PDSCH, the first parameter representing a reference value that should be used when determining the PUCCH resource used to transmit the HARQ feedback of the user equipment with respect to its corresponding PDSCH, if scheduling the CCE for the user equipment in the E-PDCCH;
   wherein the first parameter comprises a second parameter and a third parameter;
   the second parameter represents a reference value that should be used when determining the PUCCH resource used to transmit the HARQ feedback of the user equipment with respect to its corresponding PDSCH, if scheduling the CCE for the user equipment in a Physical Downlink Control Channel PDCCH; and
   the third parameter represents an offset between the first parameter and the second parameter.

2. The method according to claim 1,
   wherein the third parameter is calculated based on a setting of the number of resources used by a Physical Control Format Indication Channel PCFICH and a Physical Hybrid Repeat Indication Channel PHICH, the number of system antennas, and downlink bandwidth of a cell accessed by the user equipment.

3. The method according to claim 2, further comprising:
   calculating the third parameter by the user equipment itself;
   receiving the second parameter from a serving base station of the user equipment by the user equipment through signaling.

4. The method according to claim 2, further comprising:
   receiving the second parameter and the third parameter from a serving base station of the user equipment by the user equipment through signaling.

5. The method according to claim 1, further comprising:
   receiving the first parameter from a serving base station of the user equipment by the user equipment through signaling wherein what acquired is a minimum value, a maximum value or a mean value of index values for CCEs scheduling for the user equipment in the E-PDCCH.

6. A user equipment for determining a Physical Uplink Control Channel PUCCH resource for the user equipment, wherein the PUCCH resource is used to transmit a Hybrid Automatic Repeat Request HARQ feedback of the user equipment with respect to its corresponding Physical Downlink Shared Channel PDSCH, the user equipment comprising:
   an acquiring unit configured to acquire an index value for a Control Channel Element CCE scheduled for the user equipment in an Enhanced Physical Downlink Control Channel E-PDCCH; and
   a determining unit configured to determine, based on the index value and a first parameter, the PUCCH resource used to transmit the HARQ feedback of the user equipment with respect to its corresponding PDSCH, the first parameter representing a reference value that should be used when determining the PUCCH resource used to transmit the HARQ feedback of the user equipment with respect to its corresponding PDSCH, if scheduling the CCE for the user equipment in the E-PDCCH;
   wherein the first parameter comprises a second parameter and a third parameter;
   the second parameter represents a reference value that should be used when determining the PUCCH resource used to transmit the HARQ feedback of the user equipment with respect to its corresponding PDSCH, if scheduling the CCE for the user equipment in a Physical Downlink Control Channel PDCCH;
   the third parameter represents an offset between the first parameter and the second parameter.

7. The user equipment according to claim 6,
   wherein the third parameter is calculated based on a setting of the number of resources used by a Physical Control Format Indication Channel PCFICH and a Physical Hybrid Repeat Indication Channel PHICH, the number of system antennas, and downlink bandwidth of a cell accessed by the user equipment.

8. The user equipment according to claim 7, further comprising:
a calculating unit configured to calculate the third parameter;
a receiving unit configured to receive the second parameter from a serving base station of the user equipment through signaling.

9. The user equipment according to claim 7, further comprising:
a receiving unit configured to receive the second parameter and the third parameter from a serving base station of the user equipment through signaling.

10. The user equipment according to claim 6, further comprising:
a receiving unit configured to receive the first parameter from a serving base station of the user equipment through signaling wherein what acquired by the acquiring unit is a minimum value, a maximum value or a mean value of index values for CCEs scheduled for the user equipment in the E-PDCCH.

11. A method for facilitating the determination of a Physical Uplink Control Channel PUCCH resource for a user equipment, wherein the PUCCH resource is used to transmit a Hybrid Automatic Repeat Request HARQ feedback of the user equipment with respect to its corresponding Physical Downlink Shared Channel PDSCH, the method comprising:
acquiring a first parameter, the first parameter representing a reference value that should be used when determining the PUCCH resource used to transmit the HARQ feedback of the user equipment with respect to its corresponding PDSCH, if scheduling a Control Channel Element CCE for the user equipment in an Enhanced Physical Downlink Control Channel E-PDCCH; and
transmitting the first parameter to the user equipment through signaling;
wherein the first parameter comprises a second parameter and a third parameter;
the second parameter represents a reference value that should be used when determining the PUCCH resource used to transmit the HARQ feedback of the user equipment with respect to its corresponding PDSCH, if scheduling the CCE for the user equipment in a Physical Downlink Control Channel PDCCH; and
the third parameter represents an offset between the first parameter and the second parameter.

12. The method according to claim 11, wherein the first parameter consists of a second parameter and a third parameter, wherein
the second parameter represents a reference value that should be used when determining the PUCCH resource used to transmit the HARQ feedback of the user equipment with respect to its corresponding PDSCH, if scheduling the CCE for the user equipment in a Physical Downlink Control Channel PDCCH;
the third parameter represents an offset between the first parameter and the second parameter.

13. A base station for facilitating the determination of a Physical Uplink Control Channel PUCCH resource for a user equipment, wherein the PUCCH resource is used to transmit a Hybrid Automatic Repeat Request HARQ feedback of the user equipment with respect to its corresponding Physical Downlink Shared Channel PDSCH, the base station comprising:
an acquiring unit configured to acquire a first parameter, the first parameter representing a reference value that should be used when determining the PUCCH resource used to transmit the HARQ feedback of the user equipment with respect to its corresponding PDSCH, if scheduling a Control Channel Element CCE for the user equipment in an Enhanced Physical Downlink Control Channel E-PDCCH; and
a transmitting unit configured to transmit, through signaling, the first parameter to the user equipment;
wherein the first parameter comprises a second parameter and a third parameter;
the second parameter represents a reference value that should be used when determining the PUCCH resource used to transmit the HARQ feedback of the user equipment with respect to its corresponding PDSCH, if scheduling the CCE for the user equipment in a Physical Downlink Control Channel PDCCH; and
the third parameter represents an offset between the first parameter and the second parameter.

14. The base station according to claim 13, wherein the first parameter consists of a second parameter and a third parameter, wherein
the second parameter represents a reference value that should be used when determining the PUCCH resource used to transmit the HARQ feedback of the user equipment with respect to its corresponding PDSCH, if scheduling the CCE for the user equipment in a Physical Downlink Control Channel PDCCH;
the third parameter represents an offset between the first parameter and the second parameter.

* * * * *